United States Patent
Liu et al.

(10) Patent No.: US 12,299,796 B2
(45) Date of Patent: May 13, 2025

(54) GENERATION OF STORY VIDEOS CORRESPONDING TO USER INPUT USING GENERATIVE MODELS

(71) Applicant: Lemon Inc., Grand Cayman (KY)

(72) Inventors: Bingchen Liu, Los Angeles, CA (US); Kin Chung Wong, Los Angeles, CA (US); Peilin Li, Los Angeles, CA (US); Lexin Tang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 135 days.

(21) Appl. No.: 18/067,642

(22) Filed: Dec. 16, 2022

(65) Prior Publication Data

US 2023/0118966 A1    Apr. 20, 2023

(51) Int. Cl.
*G06T 13/80* (2011.01)
*G06F 3/16* (2006.01)
*G06F 40/30* (2020.01)
*G06T 7/50* (2017.01)
*G10L 13/02* (2013.01)

(52) U.S. Cl.
CPC .............. *G06T 13/80* (2013.01); *G06F 3/167* (2013.01); *G06F 40/30* (2020.01); *G06T 7/50* (2017.01); *G10L 13/02* (2013.01); *G06T 2200/24* (2013.01); *G06T 2207/10016* (2013.01)

(58) Field of Classification Search
None
See application file for complete search history.

(56) References Cited

U.S. PATENT DOCUMENTS

| 11,886,955 B2 | 1/2024 | David |
| 2002/0039199 A1 | 4/2002 | Nose et al. |

(Continued)

FOREIGN PATENT DOCUMENTS

| EP | 3620935 A1 | 3/2020 |
| WO | 2023239358 A1 | 12/2023 |

OTHER PUBLICATIONS

Zbinden, R., "Implementing and Experimenting with Diffusion Models for Text-to-Image Generation," Master Thesis, École Polytechnique Fédérale de Lausanne, Machine Learning and Optimization Lab (MLO), Sep. 23, 2022, 63 pages.

(Continued)

*Primary Examiner* — Yanna Wu
(74) *Attorney, Agent, or Firm* — Alleman Hall & Tuttle LLP

(57) ABSTRACT

The present disclosure provides systems and methods for video generation corresponding to a user input. Given a user input, a story video with content relevant to the user input can be generated. One aspect includes a computing system comprising a processor and memory. The processor can be configured to execute a program using portions of the memory to receive the user input, generate a story text based on the user input, generate a plurality of story images based on the story text, and output a story including the story text and a story video having content corresponding to the story text, wherein the story video includes the plurality of story images. Additionally or alternatively, the story video can include audio data and a plurality of generated animated videos, each animated video corresponding to a story image in the plurality of story images.

18 Claims, 5 Drawing Sheets

(56) References Cited

U.S. PATENT DOCUMENTS

| | | | |
|---|---|---|---|
| 2012/0044244 A1 | 2/2012 | Huang et al. | |
| 2019/0130221 A1 | 5/2019 | Bose et al. | |
| 2020/0036861 A1 | 1/2020 | Gondek et al. | |
| 2020/0065342 A1* | 2/2020 | Panuganty | G06F 16/9535 |
| 2020/0134089 A1* | 4/2020 | Sankaran | G06N 3/045 |
| 2020/0168252 A1* | 5/2020 | Bhuruth | G11B 27/34 |
| 2020/0272695 A1 | 8/2020 | Dogan et al. | |
| 2020/0342328 A1 | 10/2020 | Revaud et al. | |
| 2022/0084204 A1 | 3/2022 | Li et al. | |
| 2022/0121702 A1 | 4/2022 | Kale et al. | |
| 2022/0277218 A1 | 9/2022 | Fan et al. | |
| 2023/0237725 A1 | 7/2023 | Zoss et al. | |
| 2023/0267315 A1 | 8/2023 | Kingma et al. | |
| 2023/0368337 A1 | 11/2023 | Karras et al. | |
| 2023/0377099 A1* | 11/2023 | Kreis | G06N 3/0475 |
| 2023/0377226 A1 | 11/2023 | Saharia et al. | |
| 2023/0410270 A1 | 12/2023 | Fujita | |
| 2024/0005604 A1 | 1/2024 | Kreis et al. | |
| 2024/0037810 A1 | 2/2024 | Gong et al. | |
| 2024/0087179 A1 | 3/2024 | Min et al. | |
| 2024/0111894 A1 | 4/2024 | Kreis et al. | |
| 2024/0112088 A1 | 4/2024 | Yu et al. | |
| 2024/0115954 A1 | 4/2024 | Olson et al. | |
| 2024/0153093 A1 | 5/2024 | Xu et al. | |

OTHER PUBLICATIONS

Xu, S., "LIP-Diffusion-LM: Apply Diffusion Model on Image Captioning," arXiv Computer Vision and Pattern Recognition (cs.CV), Oct. 10, 2022, 10 pages.

Kim, G. et al., "DiffusionCLIP: Text-Guided Diffusion Models for Robust Image Manipulation," Proceedings of the IEEE/CVF Conference on Computer Vision and Pattern Recognition (CVPR 2022), Jun. 19, 2022, New Orleans, Louisiana, 28 pages.

Nichol, A. et al., "GLIDE: Towards Photorealistic Image Generation and Editing with Text-Guided Diffusion Models," Proceedings of the 39th International Conference on Machine Learning (ICML 2022), Jul. 17, 2022, Baltimore, Maryland, 20 pages.

Ramesh, A. et al., "Hierarchical Text-Conditional Image Generation with CLIP Latents," arXiv Computer Vision and Pattern Recognition (cs.CV), Apr. 13, 2022, 27 pages.

United States Patent and Trademark Office, Office Action Issued in U.S. Appl. No. 18/052,865, filed Aug. 22, 2024, 19 pages.

United States Patent and Trademark Office, Office Action Issued in U.S. Appl. No. 18/052,865, filed Feb. 26, 2025, 18 pages.

* cited by examiner

GENERATION OF STORY VIDEOS CORRESPONDING TO USER INPUT USING GENERATIVE MODELS

BACKGROUND

Generative machine learning algorithms can be implemented in probabilistic models that are able to generate new data through the analysis of regularities and patterns in training datasets. In combination with language-text matching models, such generative models can generate various types of data depending on the application. Examples of such tasks include text-to-text generation, text-to-image generation, image-to-image translation, and text-to-three-dimensional (3D) object generation.

SUMMARY

The present disclosure provides systems and methods for video generation corresponding to a user input. Given a user input, a story video with content relevant to the user input can be generated. One aspect includes a computing system comprising a processor and memory. The processor can be configured to execute a program using portions of the memory to receive the user input, generate a story text based on the user input, generate a plurality of story images based on the story text, and output a story including the story text and a story video having content corresponding to the story text, wherein the story video includes the plurality of story images. Additionally or alternatively, the story video can include audio data and a plurality of generated animated videos, each animated video corresponding to a separate story image in the plurality of story images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Generative models can be implemented in a variety of applications such as text-to-text generation, text-to-image generation, image-to-image translation, and text-to-3D object generation. However, despite pre-training on large datasets, large generative models are able to generate content that is relevant to given text prompts, but lack the ability to perform text-to-video generation. The present disclosure provides examples of systems and methods for the generation of story videos corresponding to a given user input.

Figure 1:
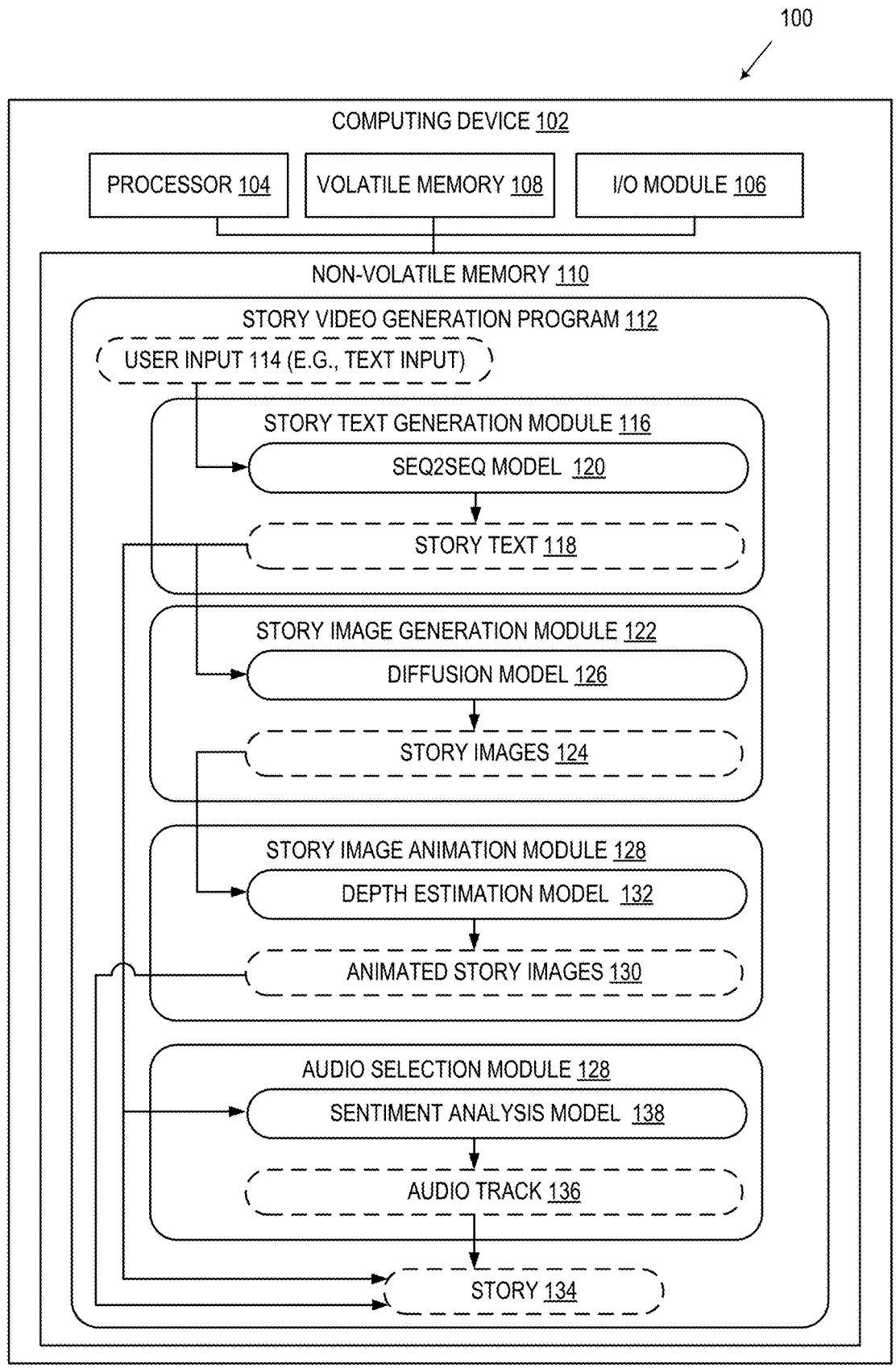
FIG. 1 shows a schematic view of an example computing system for generating a story video corresponding to user input.

FIG. 1 shows a schematic view of an example computing system 100 for generating a story video corresponding to user input. The computing system 100 includes a computing device 102 that further includes a processor 104 (e.g., central processing units, or "CPUs"), an input/output (I/O) module 106, volatile memory 108, and non-volatile memory 110. The different components are operatively coupled to one another. The non-volatile memory 110 stores a story video generation program 112, which contains instructions for the various software modules described herein for execution by the processor 104.

Upon execution by the processor 104, the instructions stored in the story video generation program 112 cause the processor 104 to initialize the video generation process, which includes receiving a user input 114. The user input 114 may be received via the I/O module 106. Generated story videos corresponding to user input 114 include videos having content related to the user input 114. The user input 114 may be provided in various formats. In some implementations, the user input 114 includes a selection based on presented options. In other implementations, the user input 114 includes provided text input. The text input can include one or more words, phrases, and/or sentences. Other forms of user input 114, such as audio input, image input, etc., can also be utilized. In some implementations, the user input 114 further includes information describing an artistic style in which the story video is to be generated.

The story video generation program 112 includes a story text generation module 116 that receives the user input 114. Depending on the application, the user input 114 can be used to generate further input for the generation of the story video. For example, the story text generation module 116 may include an encoder-decoder based model implemented for text-to-text generation to generate a story text 118 containing multiple sentences and/or phrases using the user input 114. In other implementations, the user input 114 is an audio input, image input, etc., and the story video generation module 116 can use the audio input or image input, etc., to generate the story text 118. In the depicted example, the story text generation module 116 includes a sequence-to-sequence transformer model 120 that can be used to generate a new sentence or phrase from a word, a phrase, a sentence, or multiple sentences such that the new sentence or phrase has contextual coherence with the user input from which it is generated. The sentence generation process may repeat for a predetermined number of iterations or until a predetermined length is reached, forming the story text 118. In some implementations, the predetermined number of iterations or length is provided by a user via the input/output (I/O) module 106 or any other suitable means. The sentence generation process can also be performed recursively, using the previous and newly generated sentences and/or phrases as input to the sequence-to-sequence transformer model 120. As can readily be appreciated, the user input 114 can initially include multiple sentences and/or phrases. In such cases, generation of the story text 118 may be optional such that the story text 118 is the user input 114.

The story video generation program 112 includes a story image generation module 122 that receives the story text 118. The story image generation module 122 uses the story text 118 to generate a plurality of story images 124. In some implementations, an image is generated for each sentence or phrase in the story text 118, where each image includes content related to its respective sentence. In other implementations, an image is generated for every two or more sentences and/or phrases. Various text-to-image generative models may be used to generate such images. For example, in the depicted example, the story video generation program 112 includes a generative diffusion model 126 for generating images using the story text 118. Diffusion models are a class of probabilistic generative models that can provide for processes that can generate new images within timeframes adequate for many different applications. Diffusion models typically involve two stages, a forward diffusion stage and a reverse denoising stage. In the forward diffusion process, input data is gradually altered and degraded over multiple iterations by adding noise at different scales. In the reverse denoising process, the model learns to reverse the diffusion noising process, iteratively refining an initial image, typically made of random noise, into a fine-grained colorful image.

Figure 2:
FIG. 2 shows example story images corresponding to user input.

FIG. 2 shows example story images 200-206 corresponding to user input 208. Story text 210 is generated using the user input 208. In the depicted example, the user input 208 includes a single sentence, and the generated story text 210 includes four sentences. As described above, the user input 208 can vary in format, and the generated story text 210 can vary in length. In the depicted example, the user input 208 is a text input that includes a sentence. As can readily be appreciated, the user input 208 can also be a single word, a phrase, or multiple sentences. Other forms of user input 208, such as audio input, image input, etc., can also be utilized. As described above, the story text 210 can be generated from a text input using a text-to-text generation model, such as the sequence-to-sequence transformer model 120. In other implementations, the story text 210 can be generated from an image input using an image-to-text generation model. Alternatively, the story text 210 can be generated from an audio input using an audio-to-text generation model. From the generated story text, the story images 200-206 can be generated using a text-to-image generation model, such as, for example, the generative diffusion model 126 described above. In the depicted example, a story image is generated for each sentence in the story text 210, resulting in the four generated story images 200-206. Alternatively, one story image may be generated for multiple words, phrases, or sentences or multiple story images may be generated for one word, phrase, or sentence.

Referring back to FIG. 1, an optional animation step may be performed to animate each of the story images 124. For example, the story video generation program 112 includes a story image animation module 128 for generating a plurality of animated story images 130, each of which is a video clip generated from a separate story image 124. Various animation techniques may be used to animate the images. In the depicted example, the story video generation program 112 includes a depth estimation model 132 for generating the plurality of animated story images 130. In some implementations, the depth estimation model 132 is implemented to estimate monocular depth from a single two-dimensional (2D) image. For example, the depth estimation model 132 may be implemented to take an input image, such as an RGB image, and to output a depth image that can be used with various techniques to animate the input image. For example, the depth information from the depth image may be used with parallax techniques to animate the original image. In some implementations, such techniques are applied with deep learning models to generate the plurality of animated story images 130.

The plurality of animated story images 130 may be concatenated to form a story 134, which includes the story text 118 and a story video including content corresponding to the story text 118 generated from the user input 114. An optional audio data selection step may be implemented to select an audio track 136 for use in the story 134. The selection process can be implemented in various ways. In some implementations, the audio track 136 is selected via input received from the user. In the depicted example, the audio track 136 is selected using a sentiment analysis model 138. The sentiment analysis model 138 can be implemented to analyze the content of the story text 118 and to select, or recommend, an appropriate audio track 136. In some implementations, the sentiment analysis model 138 recommends an audio genre. In such cases, the audio track 136 may be selected in accordance with the recommended audio genre through various methods. For example, the audio track 136 may be selected based on a user's input upon receiving a list of audio tracks corresponding to the recommended audio genre. Alternatively, the audio track 136 may be randomly selected from a list of selections or a library of audio tracks based on the recommended audio genre. In other implementations, the audio track 136 is generated based on the story text 118 using a generative model.

The story video generation process described in FIG. 1 can be implemented in various ways with additional or alternative components. For example, animation of the story images 124 and/or inclusion of audio data 136 can be optional. In some implementations, the plurality of story images 124 may be used to directly generate the story video in the story 134. The text-to-image generation process can also be implemented using various generative models. As described above, generative diffusion models, which are a class of probabilistic generative models that can generate data similar to the data on which they are trained, are viable for such implementations. During training, the diffusion model starts with training data, such as an input image. At each iteration, noise is successively added to the image. Different types of noise distribution can be applied depending on the model and relevant application. Typically, Gaussian noise is added at each iteration. The process continues for a predetermined number of iterations, resulting in a noised image. As noise is added, the model learns the systematic decay of information due to the added noise. Reversing this process, the model can learn to recover the destroyed information.

Diffusion models can be implemented using various different techniques. For example, a latent diffusion model operating in a low-dimensional latent space may be implemented to reduce computational cost in the image generation process, which in turn reduces inference time. The latent diffusion model can include a pre-trained variational auto-encoder (VAE) model. During the training phase, an input image in pixel space can be projected into a latent space via the pre-trained VAE model. A diffusion process can be performed to corrupt the input image with a randomly sampled time step. The latent diffusion model includes a denoising U-Net for denoising the corrupted image into a generated image. During the denoising process, the language-text matching model provides feedback on the intermediate images based on the user input. The diffusion model can then use the feedback to learn through successive iterations to generate images having content corresponding to the user input. During inference time, a noisy image goes through a similar denoising process for a predetermined number of iterations to generate a new image.

In some implementations, a generative diffusion model may be implemented along with a language-text matching model to generate images corresponding to user input. A language-text matching model including an image encoder and a text encoder can be used to project images and sentences, respectively, into vectors in a same learned latent space. In such a learned latent space, image vectors and text vectors are positioned closer when the corresponding image and text have similar semantic meaning. An example framework includes the use of a contrastive language-image pretraining model to provide guidance to the image generation process through user input.

As described above, the language-text matching model can be implemented in various ways. In some implementations, the language-text matching model includes a text encoder and an image encoder to project their respective inputs into a learned latent space that can be used to calculate the losses used for guiding the diffusion model in the image generation process.

Figure 3:
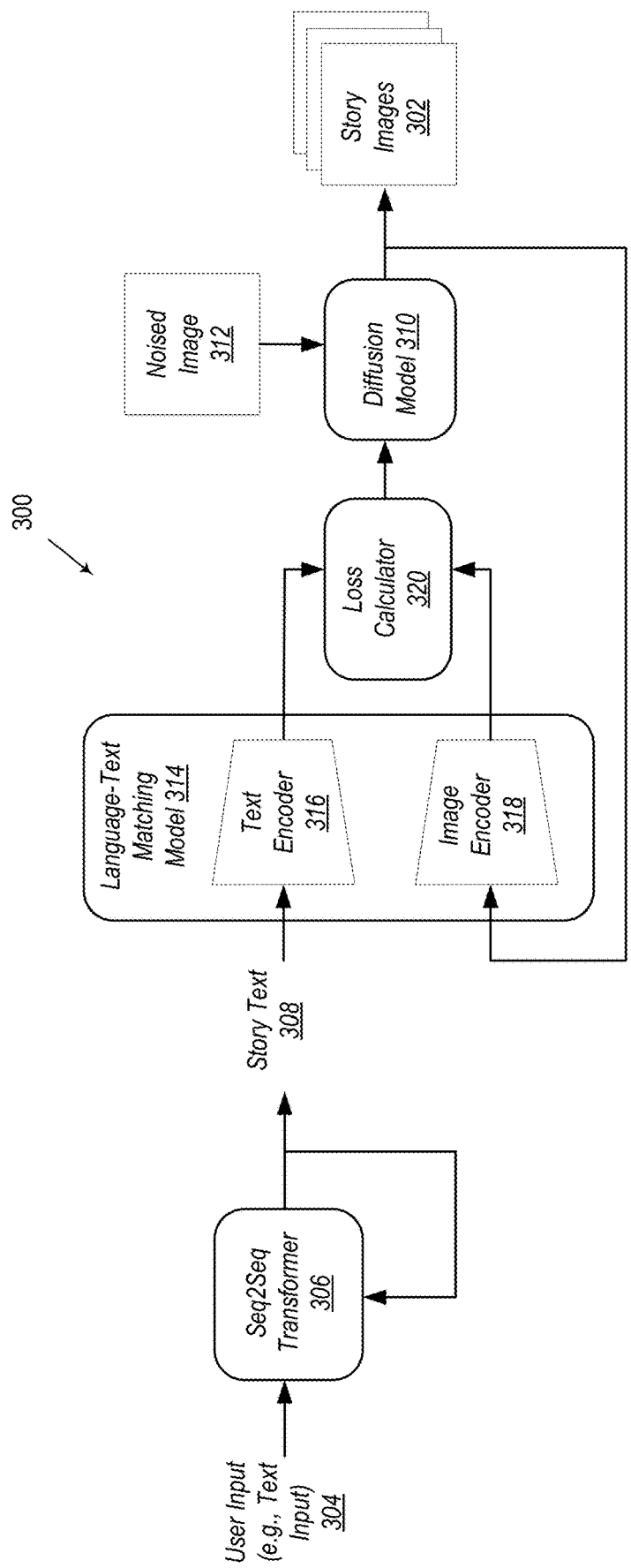
FIG. 3 shows a diagram schematically illustrating an example framework for generating story images based on user input.

FIG. 3 shows a diagram schematically illustrating an example framework 300 for generating story images 302 based on a user input 304. The framework 300 includes a sequence-to-sequence transformer model 306 that receives the user input 304 and generates new sentences and/or phrases containing contextual coherence with the user input 304. The process can repeat for a predetermined number of iterations or until a predetermined length of words/sentences is reached, and a story text 308 is outputted. The framework 300 also includes a diffusion model 310, such as those described in the sections above, for generating the story images 302. The image generation process starts with a noised image 312, and an iterative denoising process is applied by the diffusion model 310 while guided by a language-text matching model 314. The process can be repeated for each story image 302 that is to be generated. For example, a story image 302 can be generated for each sentence or phrase in the story text 308. In other implementations, a story image 302 is generated for every two or more sentences and/or phrases.

The language-text matching model 314 includes a text encoder 316 and an image encoder 318 for projecting the portion of the story text 308 related to the story image 302 that is to be generated and intermediate generated images, respectively, into vectors in a same learned latent space. In such a learned latent space, image vectors and text vectors are positioned closer when the corresponding image and text have similar semantic meaning. A loss calculator 320 may be used to calculate a loss value using the projected vectors, and the calculated loss value can then be used to guide the diffusion model 310.

Figure 4:
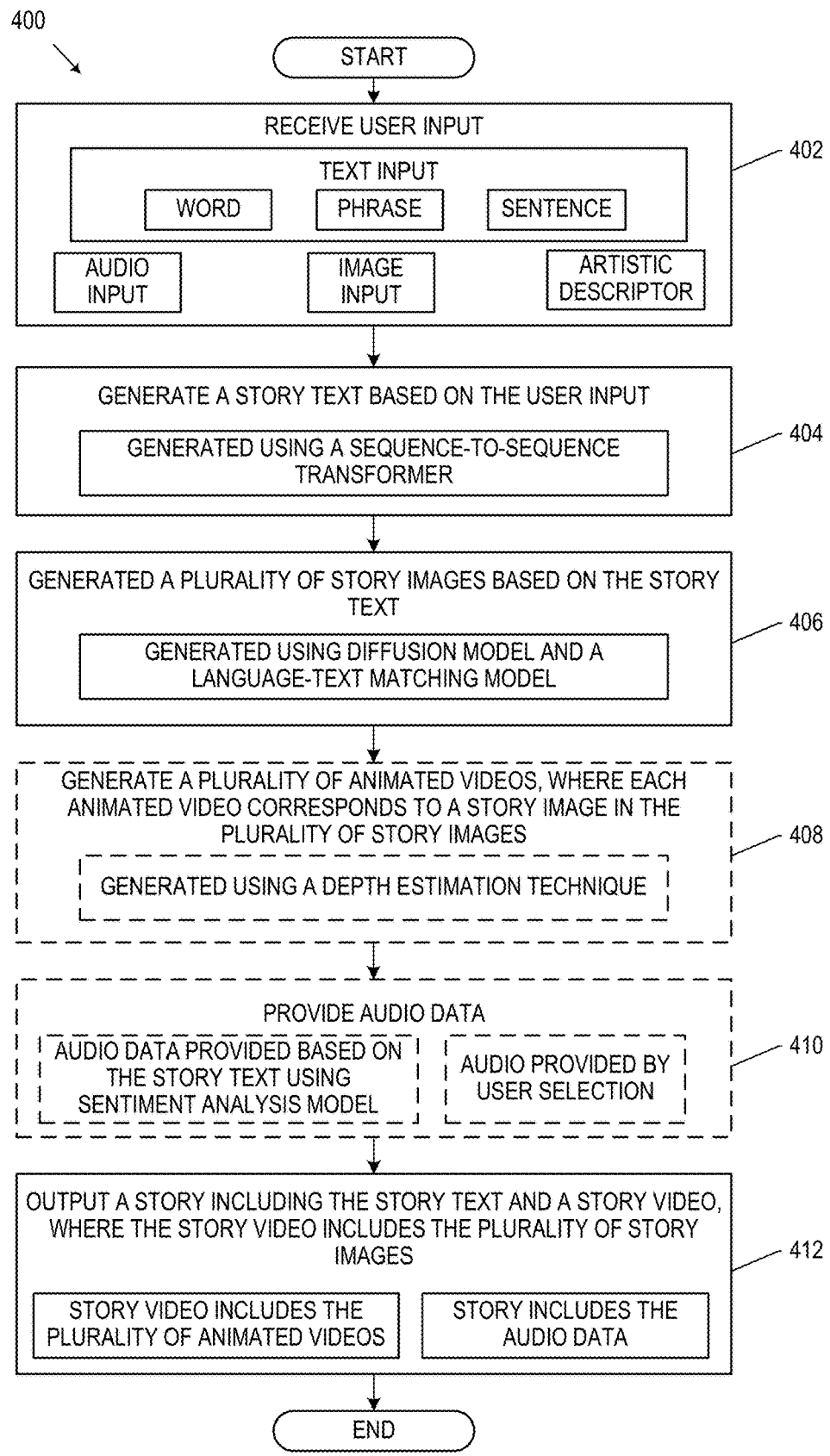
FIG. 4 shows a flow diagram of an example method for generating a story video corresponding to user input.

FIG. 4 shows a flow diagram of an example method 400 for generating a story video corresponding to user input. At step 402, a user input is received from a user. The user input can be received through various means, including I/O interfaces. The user input can be of various forms and formats. In some implementations, the user input includes text input. For example, the user input received can include one or more words, phrases, sentences, etc. Other forms of user input, such as audio input, image input, etc., can also be utilized. In some implementations, the user input includes artistic descriptor information, which describes an art style in which to generate the story video.

At step 404, a story text is generated. The story text can be generated based on the user input. In some implementations, the story text is the user input. In other implementations, the user input is used as input in an encoder-decoder based model implemented for text-to-text generation to generate the story text. For example, a sequence-to-sequence transformer model may be used to generate a new sentence or phrase from a text input. In alternative implementations, an image-to-text or audio-to-text generation model can be used to generate the story text from an audio input or image input. The generated story text can include new sentences and/or phrases that have contextual coherence with the user input that is used to generate said new sentences and/or phrases. In some implementations, new sentences or phrases may be generated until a predetermined length is reached. In some implementations, the user provides input indicating the predetermined length, which can be expressed in terms of word length, number of sentences, etc. The sentence generation process may also be performed recursively, using the previous and newly generated sentences and/or phrases as input to the sequence-to-sequence transformer model.

At step 406, a plurality of story images is generated. The plurality of story images can be generated based on the story text. Each generated story image includes content corresponding to one or more sentences and/or phrases in the story text. In some implementations, a separate story image is generated for each sentence in the story text. The story images can be generated using various text-to-image generative models, such as a generative diffusion model. Generation of the story images can also include the use of a language-text matching model to provide guidance to the generative model during the image generation process. The guidance may be provided in the form loop feedback based on loss calculations of latent space vectors corresponding to the user input and a generated image.

At step 408, a plurality of animated videos is optionally generated. An animated video can be generated by animating a story image. In some implementations, a separate animated video is generated for each story image in the plurality of story images. Animation of the story images can be performed using various methods. For example, depth estimation techniques may be applied to estimate depth from a 2D image, such as the story image. Using the depth information, the image can be animated through any of a number of different techniques, including animation through parallax calculations. In some implementations, the animation process includes the use of machine learning models.

At step 410, audio data is optionally provided. The audio data can be provided through various means. In some implementations, the audio data is received from the user. In other implementations, the audio data is selected from a database. The selection process can be implemented in various ways. For example, in some implementations, a list of audio data may be presented to the user, and the selection is performed via input received from the user. In alternative implementations, the audio data may be selected based on the story text. For example, a sentiment analysis model may be implemented to analyze the content of the story text and to select, or recommend, an appropriate audio track. In some implementations, the sentiment analysis model recommends an audio genre. In such cases, the audio data to be used can be selected in accordance with the recommended audio genre through various methods. For example, the audio data may be selected based on the user's input upon receiving a list of audio data corresponding to the recommended audio genre. Alternatively, the audio data may be randomly selected from a list of selections or a library of audio tracks based on the recommended audio genre. In other implementations, the audio data is generated based on the recommended audio genre using a generative model.

At step 412, a story is outputted. The story includes the story text and a story video with content corresponding to the story text. The story video can be generated through various methods. In some implementations, the story video is generated using the plurality of story images. Depending on whether the optional steps described above are implemented, the story may include additional content. For example, the story video may be generated by concatenating a plurality of animated videos. In some implementations, the story includes audio data, which can be provided using any of the methods described in step 410.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
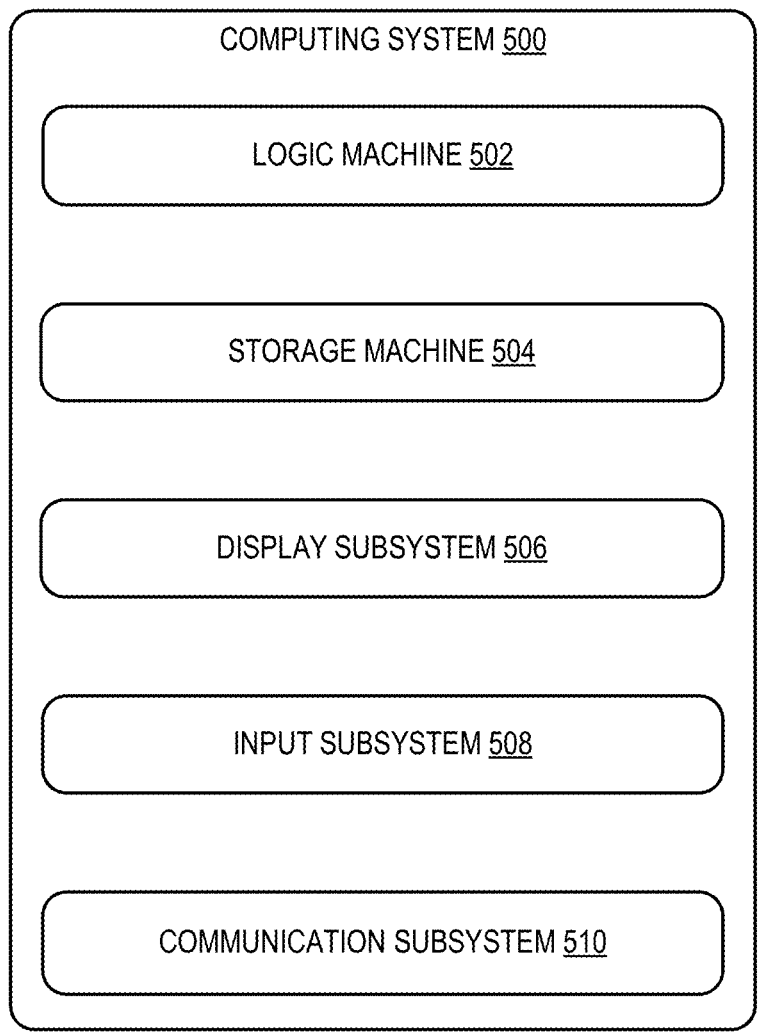
FIG. 5 schematically shows a non-limiting embodiment of a computing system that can enact one or more of the methods and processes described above.

FIG. 5 schematically shows a non-limiting embodiment of a computing system 500 that can enact one or more of the methods and processes described above. For example, the computing system 500 may be implemented onboard a head-mounted device as a controller for executing instructions to perform head posture estimation. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine 502 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 502 may include one or more processors configured to execute software instructions. Additionally or alternatively, the logic machine 502 may include one or more hardware or firmware logic machines configured to execute hardware or firmware instructions. Processors of the logic machine 502 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 502 may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem 510 may be configured for communication via a wireless telephone network, or a wired or wireless local- or wide-area network. In some embodiments, the communication subsystem 510 may allow computing system 500 to send and/or receive messages to and/or from other devices via a network such as the Internet.

Another aspect includes a computing system for video generation corresponding to a user input, the computing system comprising a processor and memory. The processor is configured to execute a program using portions of the memory to receive the user input, generate a story text based on the user input, generate a plurality of story images based on the story text, and output a story. The story includes the story text and a story video having content corresponding to the story text, wherein the story video includes the plurality of story images. In this aspect, additionally or alternatively, the processor is further configured to generate a plurality of animated videos, each animated video corresponding to one story image of the plurality of story images, and wherein the story video includes the plurality of animated videos. In this aspect, additionally or alternatively, the story video is generated using a depth estimation technique. In this aspect, additionally or alternatively, the processor is further configured to provide audio data, and wherein the story includes the audio data. In this aspect, additionally or alternatively, the audio data is provided based on a selection by a user. In this aspect, additionally or alternatively, the audio data is provided based on the story text. In this aspect, additionally or alternatively, the user input comprises a sentence. In this aspect, additionally or alternatively, the user input includes an artistic style descriptor, and the plurality of story images is generated based on the artistic style descriptor. In this aspect, additionally or alternatively, the story text comprises a plurality of sentences generated using a sequence-to-sequence transformer model and the user input. In this aspect, additionally or alternatively, the plurality of story images is generated using a generative diffusion model.

Another aspect includes a method for video generation corresponding to a user input. The method comprises receiving the user input, generating a story text based on the user input, generating a plurality of story images based on the story text, and outputting a story including the story text and a story video, wherein the story video includes the plurality of story images corresponding to the story text. In this aspect, additionally or alternatively, the method further comprises generating a plurality of animated videos using a depth estimation technique, each animated video corresponding to one story image of the plurality of story images, and wherein the story video includes the plurality of animated videos. In this aspect, additionally or alternatively, the method further comprises providing audio data based on the story text using a sentiment analysis model, wherein the story includes the audio data. In this aspect, additionally or alternatively, the story text comprises a plurality of sentences generated using a sequence-to-sequence transformer model and the user input. In this aspect, additionally or alternatively, the plurality of story images is generated using a generative diffusion model and a language-text matching model.

Another aspect includes a computing system for video generation corresponding to a user input, the computing system comprising a processor and memory. The processor is configured to execute a program using portions of the memory to receive the user input, wherein the user input includes one or more words. The processor is further configured to generate a story text based on the user input, wherein the story text includes a plurality of sentences having contextual coherence. The processor is further configured to generate a plurality of story images, wherein each story image corresponds to a sentence in the plurality of sentences. The processor is further configured to select audio data based on the story text. The processor is further configured to output a story including the story text, the selected audio data, and a story video having content corresponding to the story text, wherein the story video includes the plurality of story images. In this aspect, additionally or alternatively, the processor is further configured to generate a plurality of animated videos, each animated video corresponding to one story image in the plurality of story images, and wherein the story video includes the plurality of animated videos. In this aspect, additionally or alternatively, the plurality of animated videos is generated using a depth estimation technique. In this aspect, additionally or alternatively, the audio data is selected based on the story text using a sentiment analysis model. In this aspect, additionally or alternatively, the plurality of story images is generated using a generative diffusion model and a language-text matching model.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for video generation corresponding to a user input, the computing system comprising:
 a processor and memory, the processor configured to execute a program using portions of the memory to:
 receive the user input;
 generate a story text based on the user input, wherein the story text comprises a plurality of sentences generated by:
 generating a sentence based on the user input; and
 iteratively generating successive sentences using one or more of previously generated sentences and the user input;
 generate a plurality of story images based on the story text, each of the plurality of story images corresponding to one of the plurality of sentences; and
 output a story, the story including the story text and a story video having content corresponding to the story text, wherein the story video comprises a plurality of animated videos, each animated video corresponding to a respective story image of the plurality of story images.

2. The computing system of claim 1, wherein the story video is generated by:
 for each of the plurality of animated videos:

performing monocular depth estimation on the respective story image corresponding to the animated video;

generating the animated video by animating the corresponding respective story image using information from the monocular depth estimation.

3. The computing system of claim 1, wherein the processor is further configured to provide audio data, and wherein the story includes the audio data.

4. The computing system of claim 3, wherein the audio data is provided based on a selection by a user.

5. The computing system of claim 3, wherein the audio data is provided based on the story text.

6. The computing system of claim 1, wherein the user input comprises an input sentence.

7. The computing system of claim 1, wherein the user input includes an artistic style descriptor, and the plurality of story images is generated based on the artistic style descriptor.

8. The computing system of claim 1, wherein the plurality of sentences is generated using a sequence-to-sequence transformer model.

9. The computing system of claim 1, wherein the plurality of story images is generated using a generative diffusion model.

10. A method for video generation corresponding to a user input, the method comprising:

receiving the user input;

generating a story text based on the user input, wherein the story text comprises a plurality of sentences generated by:

generating a sentence based on the user input; and iteratively generating successive sentences using one or more of previously generated sentences and the user input;

generating a plurality of story images based on the story text, each of the plurality of story images corresponding to one of the plurality of sentences; and outputting a story including the story text and a story video, wherein the story video comprises a plurality of animated videos, each animated video corresponding to a respective story image of the plurality of story images.

11. The method of claim 10, wherein the story video is generated by:

for each of the plurality of animated videos:

performing monocular depth estimation on the respective story image corresponding to the animated video;

generating the animated video by animating the corresponding respective story image using information from the monocular depth estimation.

12. The method of claim 10, further comprising providing audio data based on the story text using a sentiment analysis model, wherein the story includes the audio data.

13. The method of claim 10, wherein the plurality of sentences is generated using a sequence-to-sequence transformer model.

14. The method of claim 10, wherein the plurality of story images is generated using a generative diffusion model and a language-text matching model.

15. A computing system for video generation corresponding to a user input, the computing system comprising:

a processor and memory, the processor configured to execute a program using portions of the memory to:

receive the user input, wherein the user input includes one or more words;

generate a story text based on the user input, wherein the story text includes a plurality of sentences having contextual coherence, and wherein the plurality of sentences is generated by:

generating a sentence based on the user input; and iteratively generating successive sentences using one or more of previously generated sentences and the user input;

generate a plurality of story images, wherein each of the plurality of story images corresponds to a sentence in the plurality of sentences;

select audio data based on the story text; and output a story including the story text, the selected audio data, and a story video having content corresponding to the story text, wherein the story video comprises a plurality of animated videos, each animated video corresponding to a respective story image of the plurality of story images.

16. The computing system of claim 15, wherein the story video is generated by:

for each of the plurality of animated videos:

performing monocular depth estimation on the respective story image corresponding to the animated video;

generating the animated video by animating the corresponding respective story image using information from the monocular depth estimation.

17. The computing system of claim 15, wherein the audio data is selected based on the story text using a sentiment analysis model.

18. The computing system of claim 15, wherein the plurality of story images is generated using a generative diffusion model and a language-text matching model.

* * * * *